US008742195B2

(12) United States Patent
Wagh et al.

(10) Patent No.: US 8,742,195 B2
(45) Date of Patent: Jun. 3, 2014

(54) ALUMINUM PHOSPHATE CERAMICS FOR WASTE STORAGE

(75) Inventors: Arun Wagh, Naperville, IL (US); Martin D. Maloney, Evergreen, CO (US)

(73) Assignee: CH2M Hill, Inc., Englewood, CO (US)

( * ) Notice: Subject to any disclaimer, the term of this patent is extended or adjusted under 35 U.S.C. 154(b) by 1148 days.

(21) Appl. No.: 10/547,100

(22) PCT Filed: Feb. 26, 2004

(86) PCT No.: PCT/US2004/005794
§ 371 (c)(1),
(2), (4) Date: Jan. 8, 2008

(87) PCT Pub. No.: WO2004/077454
PCT Pub. Date: Sep. 10, 2004

(65) Prior Publication Data

US 2008/0119682 A1 May 22, 2008

(51) Int. Cl.

| | |
|---|---|
| ***G21F 9/00*** | (2006.01) |
| ***G21F 9/16*** | (2006.01) |
| ***G21F 9/20*** | (2006.01) |
| ***C04B 12/02*** | (2006.01) |
| ***C04B 28/34*** | (2006.01) |
| ***C04B 35/00*** | (2006.01) |
| ***C04B 18/04*** | (2006.01) |
| ***C04B 14/30*** | (2006.01) |
| ***C04B 22/16*** | (2006.01) |
| ***C04B 35/63*** | (2006.01) |
| ***C01B 25/36*** | (2006.01) |
| ***G21F 9/30*** | (2006.01) |

(52) U.S. Cl.
CPC ........... *C04B 18/0463* (2013.01); *C04B 14/303* (2013.01); *C04B 12/02* (2013.01); *C04B 22/16* (2013.01); *C04B 12/022* (2013.01); *C04B 35/6309* (2013.01); *C04B 28/342* (2013.01); *C01B 25/36* (2013.01); *G21F 9/304* (2013.01)
USPC ............. 588/4; 588/1; 588/2; 588/3; 588/10; 588/20; 106/690; 501/155

(58) Field of Classification Search
CPC .. C04B 28/34; C04B 38/342; C04B 18/0463; C04B 18/04; C04B 14/303; C04B 12/02; C04B 22/16; C04B 12/022; C04B 35/6309; C01B 25/36; G21F 9/304
USPC .................. 106/690–693; 501/155; 588/1–4, 588/10–12, 16, 18, 19, 20, 249–261
See application file for complete search history.

(56) References Cited

U.S. PATENT DOCUMENTS

| | | | |
|---|---|---|---|
| 3,416,888 | A | 12/1968 | Notari |
| 4,351,749 | A | 9/1982 | Ropp |

(Continued)

FOREIGN PATENT DOCUMENTS

| | | |
|---|---|---|
| JP | 63015200 | 7/1986 |
| JP | Hei 7-204605 | 8/1995 |

(Continued)

OTHER PUBLICATIONS

Grover et al. "Low-temperature synthesis of berlinite-bonded alumina ceramics". American Ceramic Society Annual Meeting, May 1999.*

(Continued)

*Primary Examiner* — Jennifer A Smith
(74) *Attorney, Agent, or Firm* — Dorsey & Whitney LLP

(57) ABSTRACT

The present disclosure describes solid waste forms and methods of processing waste. In one particular implementation, the invention provides a method of processing waste that may be particularly suitable for processing hazardous waste. In this method, a waste component is combined with an aluminum oxide and an acidic phosphate component in a slurry. A molar ratio of aluminum to phosphorus in the slurry is greater than one. Water in the slurry may be evaporated while mixing the slurry at a temperature of about 140-200° C. The mixed slurry may be allowed to cure into a solid waste form. This solid waste form includes an anhydrous aluminum phosphate with at least a residual portion of the waste component bound therein.

25 Claims, 2 Drawing Sheets

CPBC Precursor
CONTROLLER
MOTOR
SCRUBBER
ACIDIC PHOSPHATE
$H_2O$
WATER (OPTIONAL)
ALUMINUM OXIDE
THERMAL CONTROL
WASTE
STORAGE (OPTIONAL)
90 10 92 30 80 32 66 68 64 34 56 40 42 58 24 46 22 48 60 50 52 72 70 35 20 12

(56) References Cited

U.S. PATENT DOCUMENTS

| | | | | |
|---|---|---|---|---|
| 4,412,861 | A | | 11/1983 | Kreuzmann |
| 4,705,639 | A | | 11/1987 | Aldrich |
| 4,819,571 | A | | 4/1989 | Hallett |
| 5,200,033 | A | | 4/1993 | Weitzman |
| 5,246,496 | A | | 9/1993 | Sugama |
| 5,285,000 | A | | 2/1994 | Schwitzgebel |
| 5,304,710 | A | | 4/1994 | Kigel et al. |
| 5,457,266 | A | | 10/1995 | Bege et al. |
| 5,541,386 | A | | 7/1996 | Alvi et al. |
| 5,645,518 | A | | 7/1997 | Wagh et al. |
| 5,653,872 | A | | 8/1997 | Cohan |
| 5,678,233 | A | | 10/1997 | Brown |
| 5,678,236 | A | * | 10/1997 | Macedo et al. ................. 588/11 |
| 5,732,367 | A | | 3/1998 | Yost et al. |
| 5,830,815 | A | | 11/1998 | Wagh et al. |
| 5,840,638 | A | | 11/1998 | Cao et al. |
| 5,846,278 | A | * | 12/1998 | Jantzen et al. ................ 65/17.1 |
| 5,846,894 | A | | 12/1998 | Singh et al. |
| 6,133,498 | A | | 10/2000 | Singh et al. |
| 6,153,809 | A | | 11/2000 | Singh et al. |
| 6,204,214 | B1 | | 3/2001 | Singh et al. |
| 6,258,994 | B1 | | 7/2001 | Jantzen et al. |
| 6,283,908 | B1 | | 9/2001 | Powell et al. |
| 6,498,119 | B2 | | 12/2002 | Wagh et al. |
| 6,518,212 | B1 | | 2/2003 | Wagh et al. |
| 6,776,837 | B2 | | 8/2004 | Wagh et al. |
| 7,294,291 | B2 | | 11/2007 | Wagh et al. |
| 2002/0009622 | A1 | | 1/2002 | Goodson |
| 2003/0131759 | A1 | * | 7/2003 | Francis et al. ............ 106/286.1 |
| 2004/0004885 | A1 | | 1/2004 | Comps et al. |
| 2004/0005794 | A1 | | 1/2004 | Yamashita |
| 2006/0235258 | A1 | | 10/2006 | Wagh et al. |

FOREIGN PATENT DOCUMENTS

| | | |
|---|---|---|
| JP | 2002131481 | 5/2002 |
| WO | WO-2004075207 | 9/2004 |

OTHER PUBLICATIONS

Bothe V. et al., "Low temperature synthesis of AIPO," Ceram. Trans., 1991, 16:689-699.

Gonzalez F. et al, "Reaction of orthophosphoric acid with several forms of aluminum oxide," 1980, vol. 59, No. 7 pp. 727-738.

Silsbee M. et al., "Bonding aluminum phosphate ceramics prepared at low temperature," The Pennsylvania State University Materials Research Society, 1988, 114:295-300.

Silva P. et al., "An ICPP aluminum phosphate ceramic waste form: synthesis and room-temperature temperature aqueous stability," The Pennsylvania State University Materials Research Society, 1984, 8:263-271.

Wagh A. et al., "Chemically bonded phosphate ceramics: II warm-temperature process for alumina ceramics," American Ceramic Society, 2002, pp. 1-13.

Office Action dated Sep. 9, 2008, U.S. Appl. No. 10/547,445, 13 pages.

Amendment dated Dec. 8, 2008, U.S. Appl. No. 10/547,445, 23 pages.

Office Action dated Mar. 23, 2009, U.S. Appl. No. 10/547,445, 23 pages.

Amendment dated Sep. 23, 2009, U.S. Appl. No. 10/547,445, 15 pages.

Notice of Allowance and Fee(s) due dated Jan. 6, 2010, U.S. Appl. No. 10/547,445, 16 pages.

Corrected Notice of Allowance and Fee(s) due dated Feb. 24, 2010, U.S. Appl. No. 10/547,445, 6 pages.

Office Action dated Aug. 9, 2006, U.S. Appl. No. 10/782,278, 8 pages.

Amendment dated Nov. 18, 2006, U.S. Appl. No. 10/782,278, 13 pages.

Office Action dated Feb. 5, 2007, U.S. Appl. No. 10/782,278, 5 pages.

Amendment dated May 4, 2007, U.S. Appl. No. 10/782,278, 8 pages.

Notice of Allowance dated Oct. 4, 2007, U.S. Appl. No. 10/782,278, 8 pages.

* cited by examiner

ALUMINUM PHOSPHATE CERAMICS FOR WASTE STORAGE

STATEMENT REGARDING FEDERALLY SPONSORED RESEARCH

The United States Government has rights in this invention pursuant to contract number W-31-109-ENG-38 between the United States Department of Energy and the University of Chicago, representing Argonne National Laboratory, and CRADA Number 0200201 between Argonne National Laboratory and CH2M HILL, Inc.

CROSS REFERENCE TO RELATED APPLICATION

This application claims the benefit of U.S. Provisional Application Nos. 60/537,207 (entitled "Aluminum Phosphate Ceramics For Hazardous Waste Storage" and filed 18 Jan. 2004); 60/499,453 (entitled "Aluminum Phosphate Ceramics For Hazardous Waste Storage" and filed 2 Sep. 2003); and 60/450,563 (entitled "Phosphate-Bonded Ceramic Stabilization Chemistry Applied To High Level Radioactive Wastes" and filed 26 Feb. 2003). The entirety of each of these applications is incorporated herein by reference, as is the entirety of concurrently filed U.S. application Ser. No. 10/547,445, now U.S. Pat. No. 7,745,679, which names M. D. Maloney and A. Wagh as inventors, is entitled "Method of Waste Stabilization with Dewatered Chemically Bonded Phosphate Ceramics."

TECHNICAL FIELD

The present invention generally relates to methods and apparatus for processing waste and to solid waste forms. Aspects of the invention have particular utility in connection with processing radioactive waste and other hazardous waste streams for long-term storage and/or disposal.

BACKGROUND

A number of solutions have been proposed for long-term storage and disposal of various waste streams. The options for disposing of a particular type of waste will depend in part on the nature of the waste. Safely and cost-effectively disposing of hazardous wastes, for example, presents a difficult challenge. Such hazardous waste streams may include one, two, or more of aqueous liquids, heterogeneous debris, inorganic sludges, heavy metals, organic liquids, contaminated soils, and radioactive byproducts of nuclear power generation or weapons manufacture. (As used herein, the term "hazardous waste" may include nuclear materials that may not be classified as "hazardous waste" under pertinent state, federal, or local laws or regulations.) High-level radioactive waste also presents significant processing difficulties.

One of the approaches proposed for long-term stabilization and storage of hazardous wastes, particularly radioactive wastes, is vitrification. Unfortunately, vitrification requires very high temperature processing. For example, U.S. Pat. No. 6,258,994 suggests vitrification of waste, including radioactive waste, at about 1,050-1,250° C. and states that conventional vitrification processes take place at, e.g., 1,400° C. Heating the waste to such high temperatures is quite costly. Many hazardous waste streams include hazardous materials that volatilize at "light-off" temperatures well below 1,000° C. Some hazardous components of radioactive waste streams, for example, have light-off temperatures as low as 200° C., with mercury chloride volatilizing at about 200-225° C. As a consequence, vitrifying a waste including mercury chloride or other low light-off temperature materials generates a secondary hazardous waste stream requiring further processing.

Others have proposed immobilizing or stabilizing hazardous wastes in ceramics that can be formed at lower temperatures. International Publication No. WO 92/15536 (the entirety of which is incorporated herein by reference), for example, suggests immobilizing hazardous waste in hydrated cement. A variety of chemically bonded phosphate ceramic (CBPC) products have been used to stabilize hazardous waste. For example, U.S. Pat. Nos. 5,645,518 and 5,846,894 and U.S. Patent Application Publication 2003/0092554 (the entirety of each of which is incorporated herein by reference) suggest various CBPC compositions useful for low-temperature waste processing. Conventional CBPCs suggested for waste processing are typically hydrous ceramics such as magnesium potassium phosphate hexahydrate ($MgKPO_4.6H_2O$) or newberryite ($MgHPO_4.3H_2O$).

Hydrated cements and CBPCs have proven to be quite useful in handling a variety of waste streams. Unfortunately, conventional cements and CBPCs have proven somewhat problematic for stabilizing radioactive wastes, particularly high-activity radioactive wastes. Radioactive wastes typically radiate $\gamma$ rays and $\alpha$, $\beta$, and n particles, which can decompose the bound water in hydrous cements and CBPCs in a process referred to as radiolysis to generate hydrogen gas. This hydrogen gas pressurizes storage containers or other waste forms, which can cause the containers or waste forms to fracture and admit intrusion of moisture from air, groundwater, or other elements. Under some circumstances, water can reflect nuclear radiation, increasing the chance that highly active radioactive wastes could "go critical" if the waste loading is not kept artificially low.

The significant volume and weight of the final waste form are also shortcomings of waste storage employing CBPCs and hydrated cement compositions. If the waste stream is dry or is a liquid waste with relatively low water content, additional water must be added to form the ceramic matrix. This increases both the volume and the weight of the final waste form. Even for liquid waste streams with ample water, the water chemically bound in the system can add significantly to the total weight; water comprises over 40% of the molecular weight of magnesium potassium phosphate hexahydrate, for example. The additional weight and volume can increase the already significant costs of storing and disposing of radioactive wastes.

DETAILED DESCRIPTION

A. Overview

Figure 1:
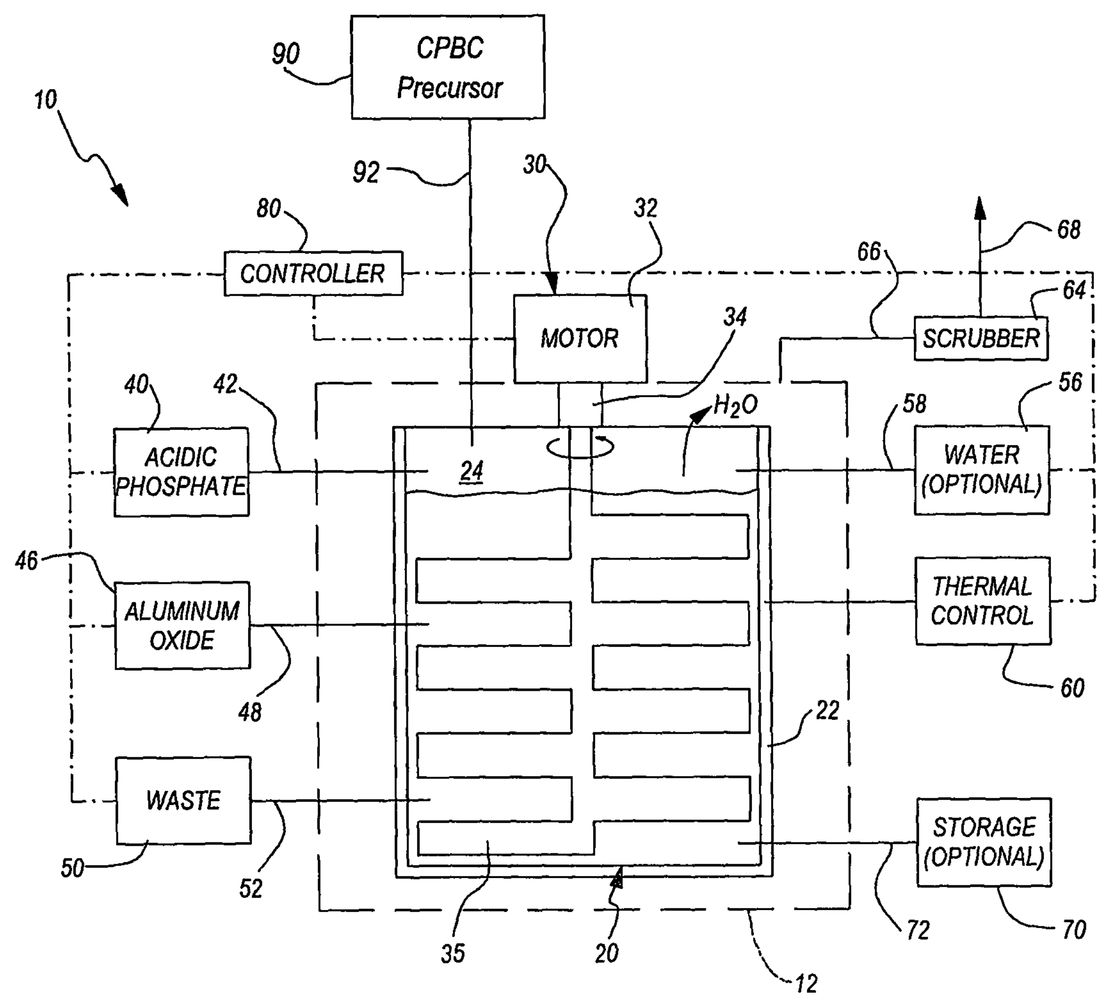
FIG. 1 is a schematic illustration of aspects of a waste processing apparatus in accordance with one embodiment of the invention.

Various embodiments of the present invention provide solid waste forms and methods for processing waste. The following text discusses aspects of the invention in connection with FIGS. 1-3 to provide a thorough understanding of particular embodiments. A person skilled in the art will understand, however, that the invention may have additional embodiments, or that the invention may be practiced without several of the details of the embodiments shown in FIGS. 1-3.

One embodiment of the invention provides a method of processing waste that includes combining a waste component with an aluminum oxide and an acidic phosphate component in a slurry that comprises water. The waste component may comprise hazardous waste and a molar ratio of aluminum to phosphorous in the slurry may be greater than one. Water in the slurry may be evaporated while mixing the slurry at a functional temperature of about 140-200° C. The mixing may be terminated and the mixed slurry may be allowed to cure into a solid waste form comprising an anhydrous aluminum phosphate with a residual portion of the waste component bound therein.

A method of producing a stable waste form in an alternative embodiment includes reacting an aluminum oxide with an acidic phosphate component in a first slurry. The first slurry is at least partially dried at a first temperature to form a phosphate precursor. The phosphate precursor and the waste are mixed in a second slurry at a second temperature of about 106-175° C. while allowing water in the second slurry to evaporate. After at least a majority of the water in the second slurry is evaporated, the mixed second slurry may be allowed to cure into a solid waste form. The solid waste form includes a remaining portion of the aluminum oxide distributed in a matrix comprising an anhydrous aluminum phosphate and at least a portion of the waste.

Another embodiment of the invention provides a method of producing a stable, low-volume waste form from a radioactive material. In accordance with this embodiment, the radioactive material is mixed with an aluminum oxide and an acid phosphate to form a slurry. A molar ratio of aluminum to phosphorous in the slurry is between about 2 and about 5 and the aluminum oxide may comprise hydrous alumina, anhydrous alumina, or aluminum hydroxide. The slurry may be heated to a first temperature that is no greater than about 200° C., but is at least as great as a dissolution temperature of the aluminum oxide with the acidic phosphate. While mixing the slurry, water is evaporated from the slurry at a second temperature of about 140-175° C. until a substantial majority of the water is evaporated. After the water evaporation, the resultant evaporated product may be allowed to cure as a solid waste form comprising aluminum oxide particles and at least a portion of the radioactive waste in a matrix comprising substantially anhydrous aluminum phosphate.

A solid waste form in accordance with still another embodiment includes a matrix comprising a substantially anhydrous aluminum phosphate and a phosphate of a heavy metal. Radioactive material and aluminum oxide particles are distributed in the matrix.

For ease of understanding, the following discussion is subdivided into three areas of emphasis. The first section discusses waste processing apparatus in accordance with selected embodiments of the invention. The second section outlines methods in accordance with other aspects of the invention. The third section outlines aspects of solid waste forms in accordance with further embodiments of the invention.

B. Waste Processing Apparatus

Select embodiments of the invention provide waste processing systems suitable for use with a variety of waste streams. FIG. 1 schematically illustrates a waste processing system 10 in accordance with one particular embodiment of the invention. The waste processing system 10 includes a waste processing vessel 20 having walls 22 defining a vessel interior 24. The vessel 20 can be open, as shown, or closeable. In one embodiment, the waste processing vessel 20 is a conventional storage tank of the type currently used to hold some liquid wastes, e.g., liquid radioactive wastes. Depending on the nature of the waste being processed, it may be advantageous to effectively enclose the waste processing vessel 20 within a "glove box" 12 or similar enclosure to limit the spread of radioactive material or other hazardous components of the waste.

An acidic phosphate may be delivered to the vessel interior 24 from a phosphate supply 40 via a phosphate delivery line 42. An aluminum oxide may be delivered to the vessel interior 24 from an aluminum oxide supply 46 via an aluminum oxide delivery line 48. Waste from a waste supply 50 may be delivered via a waste delivery line 52 to the vessel interior 24. In select embodiments, the waste processing system 10 includes a CBPC precursor supply 90, e.g., a source of magnesium oxide (MgO). A CBPC line 92 may deliver the precursor to the vessel interior 24. If needed, water from a water supply 56 may be delivered to the vessel interior 24 via a water delivery line 58.

A mixing system 30 may be used to mix the materials added to the vessel interior 24. The mixing system 30 of FIG. 1 includes a motor 32, which may be positioned outside the glove box 12 to limit contamination, coupled to a mixer 35 via a releasable coupling 34. The mixer 35 in FIG. 1 is schematically illustrated as a series of laterally-extending blades or paddles, but this is solely for purposes of illustration and any suitable shape may be used. The coupling 34 may be adapted to selectively engage the shaft of the mixer 35 for rotation by the motor 32, yet allow the mixer 35 to be readily decoupled from the motor 32. For example, the coupler 34 may provide a spline connection between the mixer 35 and the motor 32, allowing the mixer 35 to be selectively coupled or decoupled from the motor 32 by axial movement. In other embodiments, the mixing system 30 shown in FIG. 1 may be replaced by any of a variety of systems that will effectively mix the materials added to the vessel interior 24.

The waste processing system 10 may also include a thermal control 60 operatively coupled to the glove box 12 and/or the waste processing vessel 20 to control the temperature of the material in the vessel interior 24. The thermal control 60 may, for example, comprise a fluid jacket for circulating heated or cooled fluid around the vessel 20. Alternatively, the thermal control 60 may comprise a microwave source or a series of infrared heating panels adapted to direct radiation onto and/or into the vessel 20. In other embodiments, no thermal control 60 is used. This may be useful if the reaction in the vessel is sufficiently exothermic to heat the contents to the desired temperature.

As explained in more detail below, water may be driven off of the contents of the vessel interior 24 during processing. If the nature of the waste in the waste supply 50 so dictates, the water vapor and any other gas in the glove box 12 may be delivered to a scrubber 64 via a gas line 66. After scrubbing in the scrubber 64 to remove any hazardous volatile material, the gas may be vented to the atmosphere via a vent line 68.

In some embodiments of the invention detailed below, the processed waste is allowed to cure in the vessel 20. In other embodiments, it may be advantageous to remove the mixed components from the vessel 20 before they cure, e.g., in a continuous process instead of a batch process. In such an embodiment, the contents of the vessel 20 may be delivered to a storage vessel 70 via an outlet 72.

A controller 80 may be used to control aspects of the waste processing system 10. The controller 80 may be operatively coupled to one or more of the mixing system 30, the thermal control 60, the phosphate supply 40 or delivery line 42, the aluminum oxide supply 46 or delivery line 48, the waste supply 50 or delivery line 52, the CBPC precursor supply 90 or the CBPC line 92, and the water supply 56 or delivery line 58. In one embodiment, the controller 80 comprises at least one computer having a programmable processor programmed to control operation of these components to process the waste in the waste supply 50.

The aluminum oxide and the aluminum oxide supply 46 may comprise any of a variety of aluminum oxides. Suitable aluminum oxides include, but are not limited to, anhydrous aluminum oxides (e.g., corrundum, which is $Al_2O_3$), hydrous aluminum oxides (e.g., gibbsite ($Al_2O_3.3H_2O$) or böhmite ($Al_2O_3.H_2O$)), and aluminum hydroxide ($Al(OH)_3$). The aluminum oxides may be used in relatively pure form or as components of suitable minerals, e.g., bauxite or kaolin. It has been discovered that aluminosilicates are insufficiently reactive with acidic phosphates, even concentrated phosphoric acid, at the relevant temperatures to form an aluminum phosphate ceramic in accordance with embodiments of the invention. The presence of aluminosilicates in the final waste form is not likely to have any adverse consequence. When determining the amount of aluminum oxide to be added from the aluminum oxide supply 46, though, only the quantity of the non-alumina silicate aluminum oxides in the aluminum oxide supply 46 should be considered.

The phosphate supply 40 may include any acidic phosphate that is adapted to react with the aluminum oxide in the aluminum oxide supply 46 to produce a solid waste form in accordance with aspects of the invention discussed below. If so desired, the acidic phosphate may also have a suitable reaction rate with the CBPC precursor in the CBPC precursor supply 90. Examples of suitable acidic phosphates include, but are not limited to, $H_3PO_4$ (phosphoric acid) and phosphate salts such as phosphate salts of monovalent metals (e.g., K, Na, Li, or Rb). The formation of such salts and their utilization in various CBPCs are discussed in U.S. Pat. Nos. 5,830,815 and 6,153,809, the entirety of each of which is incorporated herein by reference.

Phosphoric acid can be difficult to handle safely, particularly if the processing of the waste is to be conducted in a glove box 12 or similarly restrictive enclosure. Phosphates of monovalent metals may be crystalline in form, which can enhance the ease of handling. In another embodiment, however, the acidic phosphate in the phosphate supply 40 includes, and may consist essentially of, an aluminum hydrophosphate, e.g., $AlH_3(PO_4)_2.H_2O$, $AlH_3(PO_4)_2.3H_2O$, and, optionally, additional aluminum oxide.

The waste in the waste supply 50 can be any of a variety of potentially problematic waste streams, e.g., waste streams (whether specific or mixed) that include one or more of hazardous wastes, industrial wastes other than hazardous wastes, and chemicals other than hazardous wastes that may have a meaningful environmental impact (e.g., excess nitrates or many organic chemicals). Aspects of the invention have particular utility in connection with processing hazardous wastes. As used herein, the term "hazardous waste" or "hazardous wastes" includes material that may or may not be defined as such under applicable laws and regulations, e.g., FERC or CERCLA. Hence, the term "hazardous wastes" is intended to include, but is not limited to, high-level radioactive wastes, trans-uranic (TRU) wastes, low-level radioactive wastes, fission products, nuclear materials (e.g., uranium, plutonium, and any other weapons grade or highly dangerous radioactive or pyrophoric metals), nuclear process byproducts, heavy metals, pyrophoric metals that are not nuclear materials, and toxic organic materials (e.g., PCBs or some pesticides). Unless the context indicates otherwise, the term "hazardous waste" as used herein is intended to cover both relatively specific waste streams, e.g., many high-level radioactive wastes, and mixed waste streams that may include materials not otherwise considered hazardous, e.g., contaminated soils. It is also anticipated that embodiments of the invention may be used to process hazardous wastes that are solid hazardous wastes, semi-solid hazardous wastes (e.g., sludges), or liquid hazardous wastes, which may include water, acids, oils, or organic solvents, for example. In one particular example, the hazardous waste comprises nuclear materials that are solids/powders contaminated with halogenated salts.

Figure 2:
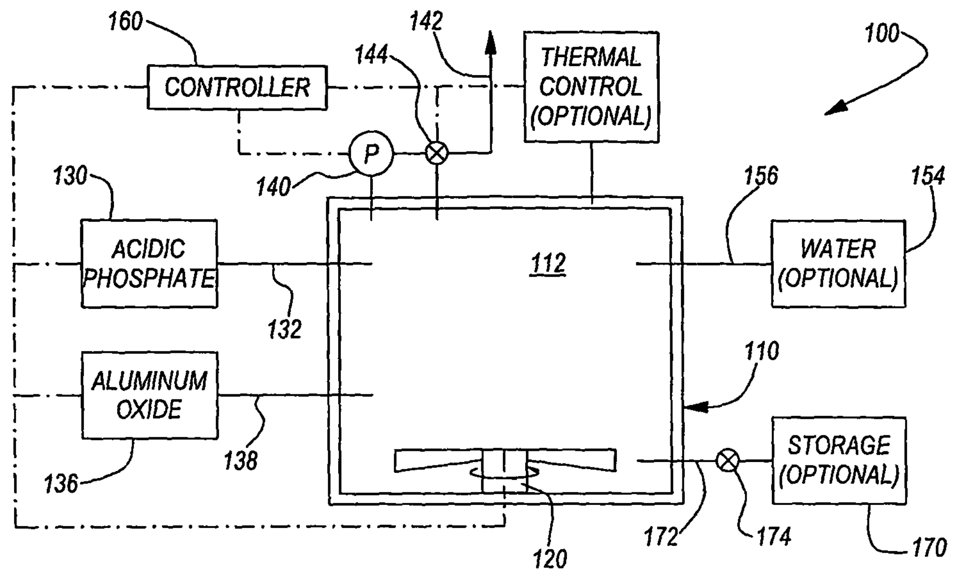
FIG. 2 is a schematic illustration of an acidic phosphate production system in accordance with another embodiment of the invention.

As noted above, the acidic phosphate in the phosphate supply 40 may include an aluminum hydrophosphate. FIG. 2 schematically illustrates a phosphate production system 100 in accordance with an embodiment of the invention that may be useful for producing aluminum hydrophosphate compositions. This phosphate production system 100 includes a phosphate production vessel 110 having a vessel interior 112. The phosphate production vessel 110 may be substantially open, allowing gases (e.g., water vapor) to exit the vessel 110; in the illustrated embodiment, the vessel 110 is substantially enclosed. A mixer 120 may be positioned at any suitable location within the vessel interior 112 to mix the reactants added to the vessel 110. An acidic phosphate may be delivered to the vessel 110 from a phosphate supply 130 via a delivery line 132. Aluminum oxide from an aluminum oxide supply 136 may be delivered to the vessel interior 112 via a delivery line 138. If it is necessary to add water to the contents of the phosphate production vessel 110, it may be delivered from a water supply 154 via a delivery line 156.

As explained below, it can be advantageous to produce aluminum hydrophosphate in the phosphate production system 100 at a temperature of 100° C. or less. A thermal control 150 may be operably coupled to the phosphate production vessel 110 to assist in appropriately controlling the temperature of the reactants in the vessel interior 112. This thermal control 150 may be adapted to heat and/or cool the contents of the vessel 110. If the phosphate production vessel 110 is sealed, as shown, the pressure in the vessel interior 112 may be monitored and/or controlled by a pressure controller 140. Water vapor and any other gases within the vessel interior 112 may be vented, e.g., to atmosphere, via a vent line 142. The vent line 142 may include a selectively controllable vent valve 144. The vent valve 144 can be operated directly by the pressure controller 140 or, if so desired, by a more direct link to the controller 160. The controller 160 in this embodiment may be similar to the controller 80 described above.

If aluminum hydrophosphate is produced in the phosphate production system 100 on a batch basis, the phosphate production vessel 110 can be emptied at the end of the batch cycle, e.g., by opening the vessel. Either to ease this removal or for continuous systems, the resultant aluminum hydrophosphate composition may exit the vessel interior 112 via an outlet line 172. An outlet valve 174 may be included to selectively open or close the outlet line 172. In the illustrated embodiment, the product exiting the outlet line 172 is delivered to storage 170. In other embodiments, the outlet line 172 may instead feed the aluminum hydrophosphate composition directly into the waste processing system 10 of FIG. 1. For example, the outlet line 172 of the phosphate production system 100 may function as the acidic phosphate delivery line 42 in the waste processing system 10.

Suitable aluminum oxides for the aluminum oxide supply 136 include those listed above as suitable for the aluminum oxide supply 46 of the waste processing system 10 (FIG. 1). Similarly, suitable acidic phosphates in the phosphate supply 130 may be substantially the same as those discussed above in connection with the phosphate supply 40 of the waste processing system 10 (FIG. 1). In one advantageous embodiment, the acidic phosphate in the phosphate supply 130 comprises phosphoric acid. Phosphoric acid typically is not sold in pure form, but is instead typically diluted with water, e.g., an aqueous solution comprising no more than about 85 weight percent phosphoric acid. In embodiments employing phosphate salts, it may be advantageous to add water from the water supply 154 to the charge of materials in the vessel interior 112.

As explained in more detail below, the aluminum hydrophosphate compositions produced in the phosphate production system 100 may provide all of the necessary quantities of acidic phosphate and aluminum oxide for processing waste in the-waste processing system 10 (FIG. 1). In such an embodiment, the phosphate supply 40 and aluminum oxide supply 46 in the waste processing system 10 may be combined into a single supply, the contents of which may be manufactured in the phosphate production system 100 of FIG. 2.

C. Methods of Processing Waste

Other embodiments of the invention provide methods of processing wastes, e.g., hazardous wastes. In the following discussion of such methods, reference is made to the waste processing system 10 shown in FIG. 1 and the phosphate production system 100 shown in FIG. 2. It should be understood that this is solely for purposes of illustration and that the following methods are not limited to use of the particular structures or systems shown in the drawings or discussed above.

In accordance with one embodiment of the invention, acidic phosphate from the phosphate supply 40, aluminum oxide from the aluminum oxide supply 46, waste from the waste supply 50, and, optionally, water from the water supply 56 may be added to the waste processing vessel 20 of FIG. 1. These materials may be mixed with the mixing system 30 to form a slurry, e.g., an aqueous slurry.

The relative proportions of the acidic phosphate, aluminum oxide, and waste added to the waste processing vessel 20 will depend, at least in part, on the nature of the materials themselves. For example, one may add more of a liquid waste having a high water content than may be appropriate if the waste were a dry waste or had a lower water content. Alternatively, a waste containing aluminum oxide may require less additive oxide. It is anticipated that waste loading (i.e., the proportion of waste in the final solid waste form) as high as about 85 weight percent (dry weight basis) may work for many types of waste. For wastes that are likely to leach hazardous materials (e.g., heavy metals), lower waste loadings may be more appropriate. For example, it is anticipated that some heavy metal-bearing waste streams may comprise as much as 70 weight percent of the final solid waste form.

In some embodiments, aluminum and phosphorus may be present in the slurry in any ratio, e.g., one or less than one. It has been found advantageous for many applications, though, to have a molar ratio of aluminum to phosphorus in the slurry greater than one. As explained below, select embodiments employing such ratios can yield solid waste forms having aluminum oxide particles distributed in an anhydrous aluminum phosphate, which may improve the mechanical properties of the solid waste form. If the Al:P ratio is too high, though, this can unduly decrease the waste loading capacity of the resultant solid waste form. Hence, Al:P molar ratios of greater than one but no greater than five are deemed particularly useful. In select embodiments, the Al:P ratio is at least about two, e.g., about 2-5, with a range of about 2-3 expected to yield suitable results without unduly increasing the weight of the solid waste form. As noted above, aluminosilicates are insufficiently reactive with acidic phosphates to form anhydrous aluminum phosphate in accordance with embodiments of the invention. Hence, in embodiments of the invention that include aluminosilicates in the slurry (whether from the aluminum oxide supply 46 or from another source), the Al:P ratio may be greater than 5, yet have an available Al:P ratio, which excludes aluminosilicates, of no greater than about 5.

As noted above, embodiments of the invention provide solid waste forms comprising anhydrous aluminum phosphates. Even if relatively little water is present in the components added to the waste processing vessel 20, water may be created or liberated during the reaction between the acidic phosphate and the aluminum oxide. For example, if the aluminum oxide is a hydrous aluminum oxide, e.g., gibbsite, the water bound in the aluminum oxide may be released. Even if the aluminum oxide in the aluminum oxide supply 46 is anhydrous (e.g., corundum), water may be generated by the reaction with the acidic phosphate component. For example, alumina may react with phosphoric acid generally in accordance with the following formula:

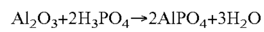

$$Al_2O_3+2H_3PO_4\rightarrow 2AlPO_4+3H_2O$$

Embodiments of the invention producing anhydrous aluminum phosphate matrix may drive this water byproduct from the waste processing vessel 20. In the particular waste processing system 10 shown in FIG. 1, this water vapor may be vented from a glove box 12 via gas line 66.

The temperature of the reactants in the waste processing vessel 20 may be controlled with the thermal control 60 to drive off the excess water in a measured fashion and to control the nature of the resultant reaction product. If one were to mix this slurry at about room temperature, as is conventional for most CBPC waste storage systems known in the art, the reaction of the aluminum oxide and the acidic phosphate would yield an aluminum hydrophosphate, e.g., $AlH_3(PO_4)_2 \cdot H_2O$ and $AlH_3(PO_4)_2 \cdot 3H_2O$. bound in the hydrophosphate can be broken down by radiolysis, generating hydrogen gas. To avoid generating hydrogen in the final waste form, the aluminum oxide and aluminum phosphate are allowed to react at an elevated temperature of at least about 100° C. As noted above, some components of hazardous waste streams, e.g., HgCl, begin to volatilize at about 200° C. To limit such volatilization, some embodiments of the invention react the aluminum oxide and the acidic phosphate at a temperature of about 100-200° C.

It is believed that having at least some water present in the system will propagate the reaction between the aluminum oxide and the acidic phosphate. Particularly for waste streams having relatively low water content, temperatures that are too high may drive off all of the water before the aluminum oxide and acidic phosphate have an adequate opportunity to react to form a strong matrix. Accordingly, in some embodiments of the invention, the temperature of the reactants is no greater than about 175° C., e.g., no greater than about 160° C. In one advantageous embodiment, the temperature is between about 100° C. and about 150° C.

The temperature at which the solubility of the aluminum oxide in phosphoric acid (which may be used as the acidic phosphate) reaches a maximum may depend on the nature of the aluminum oxide. For example, corrundum reaches a maximum solubility in phosphoric acid at about 106° C. Böhmite reaches maximum solubility around 126° C., aluminum hydroxide reaches maximum solubility at about 133° C., and gibbsite reaches maximum solubility at about 170° C. Hence, in some embodiments of the invention—especially those that employ phosphoric acid as the acidic phosphate— the temperature of the reactants is at least as great as a dissolution temperature of the aluminum oxide, which may be defined as a temperature at which the aluminum oxide reaches or nearly reaches its maximum solubility. For example, if the aluminum oxide comprises corrundum, the temperature of the slurry in the waste processing vessel 20 may be about 106-200° C. Temperatures of about 130-200° C., and desirably about 140-200° C., e.g., about 140-160° C., should be suitable for many aluminum oxides. In select embodiments, the process takes place at about 145-155° C.

Some hazardous wastes include heavy metals, e.g., lead, cesium, or technetium, that are soluble in water. Most of these heavy metals will react with an acidic phosphate to form a metal phosphate that is substantially insoluble in water. This can substantially reduce the likelihood that heavy metals in the waste being processed will leach out of the resultant solid waste form. If the heavy metal content of the waste being processed is sufficiently high, it is believed advantageous to allow the acidic phosphate in the slurry to react with the heavy metals to form insoluble phosphates at a lower temperature in an aqueous slurry, which promotes the reaction by maintaining the metals in solution. Thereafter, the temperature may be elevated to promote the formation of the anhydrous aluminum phosphate and driving off the water in the slurry.

In one exemplary embodiment for processing a waste including a heavy metal component, the slurry may be mixed at a temperature less than 100° C., e.g., between room temperature and 100° C., for at least about ten minutes before the slurry is heated to a temperature above 100° C. as described above. It is anticipated that a time of about 10-15 minutes will suffice for many waste streams. If so desired, the components may be mixed in the slurry at about room temperature and the thermal control 60 may be used to ramp up the temperature gradually to allow 10-15 minutes, for example, below 100° C.

The particular waste treatment system 10 shown in FIG. 1 includes a CBPC precursor supply 90 adapted to deliver a CBPC precursor to the interior 24 of the vessel 20 via CBPC line 92. In some embodiments that are particular useful for use with some highly acidic wastes, the CBPC precursor comprises a metal oxide that is capable of reacting with an acidic phosphate to form a CBPC, but may also be adapted to react with other acid components in the waste. In one particular implementation, the CBPC precursor comprises MgO, which is adapted to react with acidic phosphates, as explained above, but is also adapted to react with nitrates ($NO_3^-$) to form $Mg(NO_3)_2$, which is less soluble than water in many other nitrates. The formation of $Mg(NO_3)_2$ can be promoted by adding the CBPC precursor to the waste in the vessel interior 24 before adding aluminum oxide or the acidic phosphate to the vessel 20. To promote this reaction, the mixer 30 may be used to mix the slurry for a period of time, e.g., 10-15 minutes, to allow the MgO or other CBPC precursor to react with the nitrates in the waste.

The addition of a CBPC precursor from the CBPC precursor supply 90 can be advantageous for some highly alkaline wastes, as well. For example, some radioactive waste strings include high levels of nitrates (e.g., from the use of nitric acid to process spent fuel) and sodium (e.g., the addition of NaOH to neutralize the nitric acid and form the highly alkaline waste). In such an embodiment, the addition of CBPC precursor other than aluminum oxide may help bind both the sodium and nitrate components of the waste, as explained in more detail below. In such applications, it may be advantageous to mix the CBPC precursor, e.g., MgO and at least a portion of the acidic phosphate with the waste or time prior to the addition of the aluminum oxide. As in the proceeding embodiment, the mixer 30 may mix the resultant. For a period of time, e.g., 10-15 minutes, to allow the CBPC precursor reaction to proceed, after which the aluminum oxide and any remaining amount of the acidic phosphate may be added.

The mixing system 30 may continue to mix the slurry as water evaporates from the reactants in the vessel 20. In addition to keeping the components well-mixed, the mixing will help release water vapor from the slurry. This, in turn, will reduce voids in the solid waste form, increasing its strength and reducing its volume. In one embodiment of the invention, the pore volume of the final solid waste form, i.e., the total volume of the internal voids, is no greater than about 5% of the volume of the solid waste form. In one particular embodiment, the pore volume is no greater than about 3 volume percent, with pore volumes of no greater than about 1 volume percent being particularly advantageous for many applications.

As the reaction proceeds and water is driven off, it will become increasingly difficult to drive the mixer 35. In select embodiments of the invention, the mixing system 30 stops mixing the slurry when the slurry reaches a terminal consistency. This terminal consistency may be determined in a number of ways. In one embodiment, it may be determined by monitoring a force required to drive the mixer 35 with the motor 32; once the requisite driving force reaches a predetermined limit, the controller 80 may terminate operation of the motor 32, allowing the mixer 35 to stop. If so desired, the mixer 35 may then be lifted out of the reaction vessel 20 and reused for another reaction vessel. In one particular embodiment of the invention, though, the mixer 35 may be left in the slurry as it hardens into the final solid waste form (discussed below in connection with FIG. 3). The releasable coupling 34 between the mixer 35 and the motor 32 will facilitate separation of the solid waste form, including the mixer 35, from the motor 32. A new mixer 35 may then be coupled to the motor 32 for processing the next batch of waste.

After mixing is terminated, the reactants in the slurry may be allowed to cure into a solid waste form. To enhance uniformity of the solid waste form, the slurry at the terminal consistency should be sufficiently stiff to avoid undue settling of the components of the slurry.

As explained above in connection with FIG. 2, some embodiments of the invention may employ an aluminum hydrophosphate composition as the acidic phosphate in the acidic phosphate supply 40 in the waste processing system 10 (FIG. 1). In accordance with one such embodiment, at least a portion of the aluminum oxide requirements of the slurry in the waste processing vessel 20 may be combined with the acidic phosphate component in a phosphate precursor slurry. For example, an aluminum oxide from an aluminum oxide supply 136 and an acidic phosphate from the acidic phosphate supply 130 may be added to the phosphate production vessel 110 of the phosphate production system 100 (FIG. 2). This slurry may be mixed with the mixer 120 to promote uniformity.

If so desired, the resultant slurry, which will comprise aluminum hydrophosphate, may be used in the acidic phosphate supply 40 of the waste processing system 10 of FIG. 1. In other embodiments, the slurry in the phosphate production vessel 110 (FIG. 2) is at least partially dried to form an acidic phosphate precursor that may be more concentrated and/or easier to handle. In one particular embodiment, the phosphate precursor slurry is dried sufficiently to form a paste or cake that includes the aluminum hydrophosphate. In another particular embodiment, the phosphate precursor slurry is substantially completely dried, yielding a powdered phosphate precursor. Such pastes and powders may prove easier to store and use later in processing waste.

As noted above, some embodiments react an acidic phosphate and an aluminum oxide at an elevated temperature, e.g., 130-200° C., to yield anhydrous aluminum phosphates. To reduce the percentage of anhydrous aluminum phosphates in the phosphate precursor, the phosphate precursor slurry may be dried at a temperature of no greater than about 130° C., e.g., at or below 100° C. In one particular embodiment, the aluminum oxide and the acidic phosphate are added to the phosphate production vessel 110 at about room temperature. The reaction to form the aluminum hydrophosphate is an exothermic reaction and can increase the temperature of the slurry. If necessary, the thermal control 150 may be used to maintain the slurry at a temperature of no greater than about 130° C. over most or all of the reaction time.

As noted above, a molar ratio of aluminum to phosphorus in the waste slurry is desirably greater than one, e.g., about 2-5. If so desired, the ratio of aluminum to phosphorus in the aluminum hydrophosphate composition may have the same Al:P ratio desired for the waste processing step. In such an embodiment, the aluminum hydrophosphate composition would include both aluminum hydrophosphate and an excess of aluminum oxide. It is believed that an aluminum hydrophosphate composition that includes a significant excess of aluminum oxide, e.g., an Al:P ratio of two or greater, may be advantageously formed in a two-step process. In one exemplary embodiment, a first-stage aluminum hydrophosphate composition having an Al:P ratio of about 0.95-1.1 is formed in accordance with the process outlined above. Thereafter, the first-stage aluminum hydrophosphate composition may be mixed with a sufficient quantity of an aluminum oxide powder to increase the Al:P ratio to the desired level. In one particular implementation, the first-stage aluminum hydrophosphate composition is sufficiently dried to form a paste or a powder before mixing with the aluminum oxide powder.

Hence, an aluminum hydroxide composition in one embodiment may provide both the acidic phosphate and the aluminum oxide employed in the waste slurry. In such an embodiment, it is anticipated that the waste slurry will have more water than the aluminum hydrophosphate composition. If the waste is a liquid waste including water, this water may come from the waste itself. Otherwise, additional water may be added from the water supply 56 to yield a suitable slurry and promote conversion of the aluminum hydrophosphate to an anhydrous aluminum phosphate at elevated temperatures.

In other embodiments of the invention, the Al:P ratio in the aluminum hydrophosphate composition is less than the Al:P ratio desired in the waste slurry. If so desired, the Al:P ratio may be less than one, leaving an excess of the acidic phosphate in the aluminum hydrophosphate composition. In other embodiments, the Al:P ratio may be about one, yielding a substantially stoichiometric balance that may yield an aluminum hydrophosphate composition that consists essentially of aluminum hydrophosphate. In other embodiments, the Al:P ratio may be greater than one, but still less than the Al:P ratio desired in the waste slurry. For example, the Al:P ratio in the aluminum hydrophosphate composition may be between about one and about two, e.g., about 1-1.1, yielding an aluminum hydrophosphate composition with an excess of the aluminum oxide.

D. Adaptations for Specific Waste Streams

As noted previously, some embodiments of the invention are particularly well-suited for the long-term storage of radioactive wastes, including high-level radioactive wastes. Even though the waste form may be stable and exhibit minimal radiolysis, the resultant solid waste form may still give off substantial radiation. In accordance with one particular embodiment, radiation-shielding components may be added to the waste slurry. For example, boron may be added to the waste slurry (e.g., in the form of $^{10}B_4C$) to help absorb neutrons and block gamma radiation. Hematite and/or magnetite may be added to the waste slurry to provide a means to attenuate photons. Similarly, bismuth (III) oxide may be added to the waste slurry to enhance the gamma-ray shielding properties of the solid waste form. The addition of such components to other CBPCs (e.g., magnesium potassium phosphates) for use as external radiation shields is discussed in PCT International Publication No. WO 02/069348, the entirety of which is incorporated herein by reference.

Wastes in certain embodiments of the invention may contain mercury and/or chromium. For such wastes, it may be advantageous to add a quantity of a sulfiding agent, e.g., less than about 1 weight percent, preferably no greater than about 0.5 weight percent, $Na_2S$, to convert the metals into their sulfides. Such sulfides tend to be more stable and less likely to leach from the final waste form. Similarly, a reductant, e.g., less than 1 weight percent, preferably no greater than about 0.5 weight percent, $SnCl_2$, may be added to wastes containing technetium. As discussed in U.S. Pat. No. 6,133,498 (Singh et al., the entirety of which is incorporated herein by reference), the $SnCl_2$ or the like can limit the leaching of technetium from the final waste form. It is also anticipated that 0.5 weight percent or less of the tin chloride can react with any mercury and/or chromium in the waste to form a stable chloride. Hence, it may be possible to omit the use of $Na_2S$ even in wastes that contain mercury and/or chromium. In one embodiment, the heavy metals are given a period of time to react with the sulfiding agent and/or reductant before completing the conversion of the aluminum oxide to aluminum phosphate. Hence, in one embodiment, the slurry is mixed at a temperature of no greater than about 130° C. for a period of time, e.g., 10-15 minutes. Thereafter, the slurry may be heated to a higher temperature, e.g., about 140-200° C., to promote formation of $AlPO_4$.

One advantage of select embodiments of the invention is the ability to readily handle salt-bearing wastes, alkaline wastes, and acidic wastes. Although salt-bearing wastes can be particularly problematic when using portland cements or the like, most salts should have little effect on the formation of the $AlPO_4$ matrix discussed above. Alkaline wastes can also be handled fairly readily simply by increasing the quantity of acidic phosphate added to the waste slurry. For example, a small amount of phosphoric acid may be added to the slurry to bring the slurry to an acceptable pH level. In an analogous fashion, acidic wastes can be effectively neutralized to acceptable pH levels by adding additional oxides to the waste slurry. In one embodiment, this additional oxide may comprise an additional quantity of aluminum oxide, e.g., $Al_2O_3$ and/or $Al(OH)_3$, or magnesium oxide, which is explained above as facilitating treatment of nitrate-containing wastes. As noted previously, other waste streams may be highly alkaline. As one example, some acidic wastes including high concentrations of nitric acid have been neutralized and rendered alkaline by the addition of NaOH, leaving both sodium and nitrates in the waste.

Some waste streams are highly acidic. For example, waste streams from plutonium extraction or other nuclear material processing approaches may include high concentrations of nitric acid. In many conventional processes, including cementation and pozzolonic processes, sodium and nitrates are both highly leachable. In thermal processes, sodium and nitrates are both highly corrosive and may volatilize. It has been found that the use of at least some CBPCs can substantially reduce the leaching of sodium and nitrates from a waste form. In one embodiment, therefore, a CBPC precursor other than an aluminum oxide is mixed with a waste, either prior to or concurrently with the addition of the aluminum oxide and/or to the acidic phosphate to the waste slurry. In one particular example, the CBPC precursor comprises calcined MgO and the acidic phosphate comprises monopotassium phosphate ($KH_2PO_4$), which can yield a CBPC that comprises magnesium potassium phosphate hexahydrate ($MgKPO_4.6H_2O$). As discussed in U.S. Provisional Application 60/450,563 (the entirety of which is incorporated herein by reference) the MgO is believed to form a CBPC that can help effectively bind or incorporate both sodium and nitrates, including both $MgNaPO_4.nH_2O$ and $KNO_3$.

In another embodiment noted above, the CBPC precursor comprises calcined MgO and is added prior to the addition of the acidic phosphate, forming $MgNO_{3\ 2}$, which will tend to form small particles. These small, relatively insoluble particles may be bound within the $AlPO_4$ matrix. If an excess of MgO is employed, it may react with the acidic phosphate to form a magnesium phosphate.

Safely forming solid waste forms from oily wastes has been particularly problematic in some applications. In accordance with embodiments of the present invention, the oily wastes may be effectively cleaned with phosphoric acid, which may act as a detergent and break down the oily wastes. Premixing the oily waste with phosphoric acid will help break down the waste, and this premix may be added to the waste slurry. Alternatively, an additional quantity of acidic phosphate, advantageously phosphoric acid, may be added to the waste slurry to break down the oily waste in the waste processing vessel 20 (FIG. 1). If so desired, the waste slurry in such an embodiment may be mixed for a time below 130° C., e.g., below about 100° C., for a time before heating it to a higher second temperature, e.g., 140-175° C.

Embodiments of the invention also effectively handle carbonate-bearing wastes. In some known processes, the generation of carbon dioxide from carbonates may form undesirable voids in the solid waste form. As noted above, mixing the waste slurry in accordance with embodiments of the invention allows water vapors to escape the slurry. This same mixing may also allow any generated $CO_2$ to be released prior to curing of the solid waste form.

E. Solid Waste Forms

The waste slurry may be allowed to cure in any suitable shape. For example, the waste slurry may be removed from the waste processing vessel 20 via the outlet 72 and cast into suitable sizes and shapes using known casting techniques.

Figure 3:
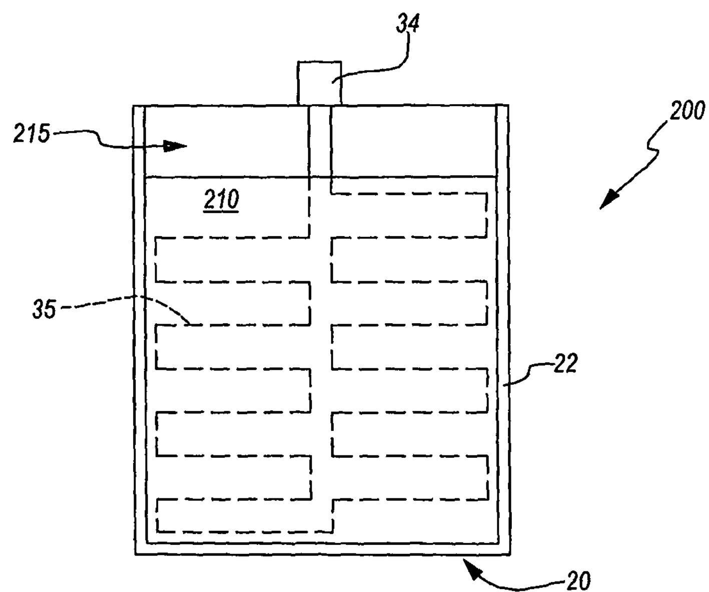
FIG. 3 is a schematic illustration of a solid waste form in accordance with a further embodiment of the invention.

FIG. 3 schematically illustrates a solid waste form 200 in accordance with one particular embodiment of the invention. The solid waste form 200 is indicative of a solid waste form that may be produced using the waste processing system 10 shown in FIG. 1. In this embodiment, the waste processing vessel 20 and the mixer 35 may be incorporated in the solid waste form 200. A majority of the mixer 35 may be embedded in the solid ceramic 210 resulting from the reactions outlined above. The volume of the solidified ceramic may be less than the total volume of the waste slurry due to driving off the water in the waste slurry. This may leave a head space 215 between the solid ceramic 210 and the top of the waste processing vessel 20.

If so desired, the head space 215 may be partially or fully filled with a "clean" material such as a waste-free CBPC, an organic resin, or a castable cement to limit exposure of the ceramic 210 to the elements. In an alternative approach, some or all of the head space 215 may be filled with an additional quantity of a waste-bearing anhydrous aluminum phosphate composition. In one particular embodiment, the additional quantity of the waste-bearing aluminum phosphate composition may be prepared generally as outlined above in a second waste processing vessel 20 (FIG. 1). When the slurry in the second waste processing vessel 20 is dried to a desired level, e.g., when it reaches a putty-like consistency, it may be added to the head space 215 in the first waste processing vessel 20 (FIG. 3). In one particular embodiment, the material from the second vessel 20 may be added to the head space 215 before the material in the first vessel 20 is allowed to completely cure. This may promote bonding of the added material to the material already present in the vessel, forming a solid ceramic 210 that substantially fills the volume of the waste processing vessel 20.

The ceramic 210 will generally include a matrix with particles embedded therein. The matrix will comprise an anhydrous aluminum phosphate, e.g., aluminum orthophosphate ($AlPO_4$) with minor amounts of aluminum metaphosphate ($Al(PO_3)_3$). Although the matrix may also include aluminum hydrophosphates, the proportion of the hydrophosphate in the matrix is desirably kept relatively low or substantially eliminated. The anhydrous aluminum phosphate matrix may also bind components of the waste in the ceramic 210. For example, if the waste stream includes heavy metals, the matrix may bind phosphates of the heavy metals. If the waste includes particulate matter, these particles may be distributed as discrete particles within the matrix and may be substantially encapsulated in the matrix. If the waste comprises a radioactive waste, the radioactive waste will typically be distributed in the matrix. In one embodiment, the components of the waste are substantially uniformly distributed in the matrix.

As noted above, the molar ratio of aluminum to phosphorus in the waste slurry is desirably greater than one. This will leave an excess of the aluminum oxide in the solid waste form. Typically, the aluminum oxide will start as a particulate component, e.g., particles of alumina. These aluminum oxides may be distributed in the matrix and may be advantageously distributed substantially uniformly throughout the matrix. It is believed that these aluminum oxide particles within the phosphate matrix will enhance the mechanical properties of the solid ceramic 210 and, hence, the waste form 200.

In one embodiment noted above, a CBPC precursor other than an aluminum oxide, e.g., an oxide of magnesium or another metal, may be added to the slurry. Particularly if this CBPC precursor is allowed an opportunity to react with a nitric acid-laden waste prior to addition of the aluminum oxide and the acidic phosphate, it is anticipated that the CBPC precursor will form particles of a metal nitrate, e.g., $Mg(NO_3)_2$ if the CBPC comprises MgO. The particles are expected to remain in the slurry and, ultimately, in the final waste form. If an alkaline waste including Na and $NO_3^-$ is treated with a magnesium oxide and an acidic phosphate, the resultant magnesium phosphate may define particles that are embedded in the anhydrous aluminum phosphate matrix in the waste form. Investigation and characterization of such a magnesium oxide-based CBPC is still being characterized, but it is currently surmised that at least a portion of this specific CBPC takes a pseudo-hydroxyapatite form, e.g., $MgNa(PO_4).nH_2O$. If nitrates are present in the slurry, this CBPC may also or instead form a nitrated apatite-type mineral not previously reported in the literature. Hence, the waste form in this particular example may comprise one or both of a) a pseudo-hydroxyapatite including magnesium and sodium and b) a nitrated apatite including sodium and nitrate in a matrix that includes an anhydrous aluminum phosphate.

In one particular embodiment, the amount of magnesium oxide added exceeds the stoichiometric amount needed to react with the nitrides and/or other compounds in the waste. If a superstoichiometric amount of aluminum oxide is also added to the slurry, the resultant waste form may include particulate aluminum oxide and magnesium oxide. It is believed that the magnesium oxide will react with hydrogen in the waste form. Hence, if radiolysis of water generates any hydrogen gas, the excess magnesium oxide may serve as a getter, reducing the risks noted above associated with radiolysis.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

The invention claimed is:

1. A method of processing waste, comprising:

combining a waste component with an aluminum oxide and an acidic phosphate component in a waste slurry comprising water, wherein the waste component comprises hazardous waste and a molar ratio of aluminum oxide to metal phosphate in the slurry is greater than one and wherein the acidic phosphate component is a phosphate of a monovalent metal;

evaporating water in the slurry while mixing the slurry at a functional temperature of about 140-200° C.; and allowing the mixed slurry to cure into a solid waste form comprising an anhydrous compound of aluminum oxide and metal phosphate with a residual portion of the waste component bound therein, wherein:

combining the waste component, the aluminum oxide, and the acidic phosphate component in the waste slurry comprises:

reacting at least a portion of the aluminum oxide with the acidic phosphate component in a phosphate precursor slurry;

at least partially drying the phosphate precursor slurry to form a phosphate precursor comprising a paste or a powder; and after at least partially drying the phosphate precursor slurry, mixing the phosphate precursor with the waste component in the waste slurry, the waste slurry having more water than the phosphate precursor prior to the evaporation of the water in the waste slurry.

2. The method of claim 1 wherein the waste component comprises a heavy metal, further comprising mixing the slurry at a temperature of no greater than about 130° C. for a first time before mixing the slurry at the functional temperature.

3. The method of claim 1 wherein the aluminum oxide comprises aluminum hydroxide or anhydrous $Al_2O_3$.

4. The method of claim 1 wherein the aluminum oxide and the acidic phosphate component are combined prior to combining with the waste component.

5. The method of claim 1 further comprising terminating the mixing upon reaching a terminal consistency.

6. The method of claim 1 wherein combining in the slurry further comprises combining a CBPC precursor other than an aluminum oxide with the waste component and the acidic phosphate in the slurry and, thereafter, adding the aluminum oxide to the slurry.

7. The method of claim 1 wherein the waste component is stored in a waste storage container and wherein the waste component, aluminum oxide, and acidic phosphate component are combined in the waste storage container.

8. The method of claim 1 wherein the slurry further comprises at least one of $SnCl_2$ or $Na_2S$.

9. The method of claim 1 wherein the waste has a first pH level, and further comprising adding a neutralizing material to the waste before allowing the mixed slurry to cure to at least partially neutralize the waste so the waste has a second pH level different from the first pH level.

10. The method of claim 9 wherein the neutralizing material is added to the waste before the waste is combined with the aluminum oxide and the acidic phosphate.

11. The method of claim 1, further comprising adding at least one of a beta-absorptive, gamma-absorptive, alpha-absorptive, or neutron-absorptive material directly to the waste before allowing the mixed slurry to cure.

12. The method of claim 11 wherein the at least one of a beta-absorptive, gamma-absorptive, alpha-absorptive, or neutron-absorptive material is added to the waste before the waste is combined with the aluminum oxide and the acidic phosphate.

13. The method of claim 1, further comprising dewatering the waste during or before the waste is combined with the aluminum oxide and the acidic phosphate.

14. The method of claim 1, further comprising adding a neutralizing material to the waste to at least partially neutralize the waste before the waste is combined with the aluminum oxide and the acidic phosphate.

15. The method of claim 14 wherein the neutralizing material is added before the evaporating the water.

16. The method of claim 14 wherein the neutralizing material is added after evaporating the water, and mixing occurs after adding the neutralizing material.

17. The method of claim 14, further comprising adding an $H_2$ getter agent to the waste or the slurry to reduce $H_2$ gas generation.

18. The method of claim 1 wherein the $H_2$ getter agent include MgO.

19. The method of claim 1 wherein the waste is an acidic waste, further comprising neutralizing the waste with at least one metal oxide.

20. The method of claim 1, further comprising adding a salt to the slurry to control reaction rates during mixing of the slurry.

21. The method of claim 1, further comprising adding at least one of a stabilizing agent or a reactant agent to the waste or the slurry.

22. The method of claim 1, further comprising adding an exothermic agent to at least one of the waste or the slurry that reacts to create heat that heats the at least one of the waste or the slurry.

23. The method of claim 1, further comprising adding to least one of the waste or the slurry a shielding agent for neutrons, alpha particles, beta particles, or gamma particles in the waste to provide an at least partially self-shielding waste.

24. The method of claim 1, wherein the anhydrous compound of aluminum oxide and metal phosphate is aluminum monovalent phosphate, aluminum magnesium phosphate, aluminum cesium phosphate, aluminum potassium phosphate, aluminum sodium phosphate, aluminum lithium phosphate, aluminum strontium phosphate or aluminum zirconium phosphate.

25. The method of claim 1, wherein the waste component is radioactive waste.

* * * * *